United States Patent [19]

Oyanagi et al.

[11] Patent Number: 4,835,980
[45] Date of Patent: Jun. 6, 1989

[54] METHOD FOR CONTROLLING REFRIGERATING SYSTEM

[75] Inventors: Reinosuke Oyanagi; Hazime Tanaka, both of Yokohama, Japan

[73] Assignee: Fuji Koki Mfg. Co. Ltd., Tokyo, Japan

[21] Appl. No.: 136,338

[22] Filed: Dec. 22, 1987

[30] Foreign Application Priority Data

Dec. 26, 1986 [JP] Japan .................................. 61-308617

[51] Int. Cl.⁴ .............................................. F25B 41/04
[52] U.S. Cl. ........................................ 62/212; 62/158; 62/225
[58] Field of Search ................. 62/212, 210, 211, 225, 62/209, 224, 158

[56] References Cited

U.S. PATENT DOCUMENTS

| | | | |
|---|---|---|---|
| 2,577,903 | 12/1951 | McGrath | 62/212 |
| 4,459,819 | 7/1984 | Hargraves | 62/212 |
| 4,475,686 | 10/1984 | Huelle et al. | 62/212 |
| 4,617,804 | 10/1986 | Fukushima et al. | 62/212 |
| 4,689,968 | 9/1987 | McCulloch et al. | 62/212 X |

Primary Examiner—Harry B. Tanner
Attorney, Agent, or Firm—Joseph Scafetta, Jr.

[57] ABSTRACT

An electric signal T1 representing the evaporating temperature of refrigerant is processed by a phase lead network and thus converted to T1' with a single time constant so as to compensate for the time lag due to the time constant of a temperature sensor for sensing the evaporating temperature. An electrical signal T2 representing superheated vapor temperature at the outlet of an evaporator is processed by a phase lag network and thus converted to T2', so as to have a larger time constant than that of the unprocessed signal T2 and a signal corresponding to $\Delta T' = T1' - T2'$ is used to control the degree of valve opening of an electric expansion valve.

7 Claims, 7 Drawing Sheets

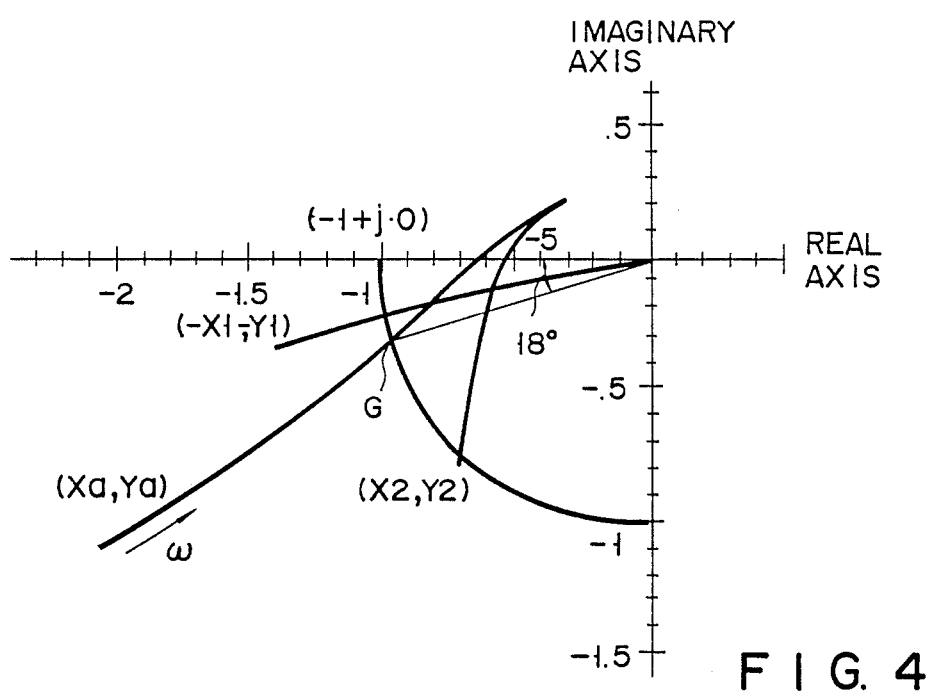
F I G. 4

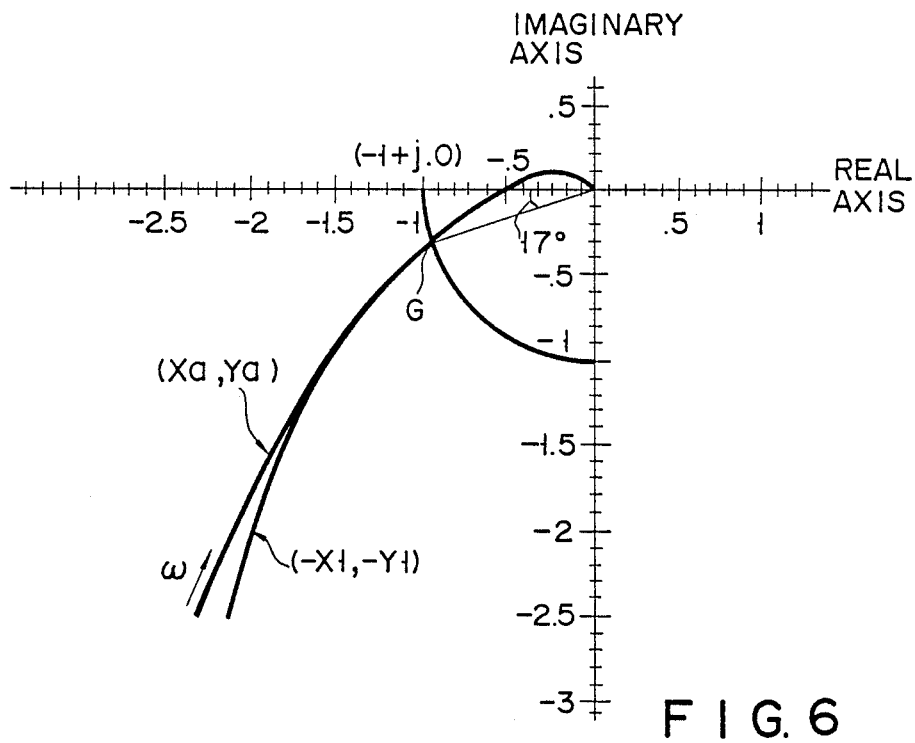
F I G. 6

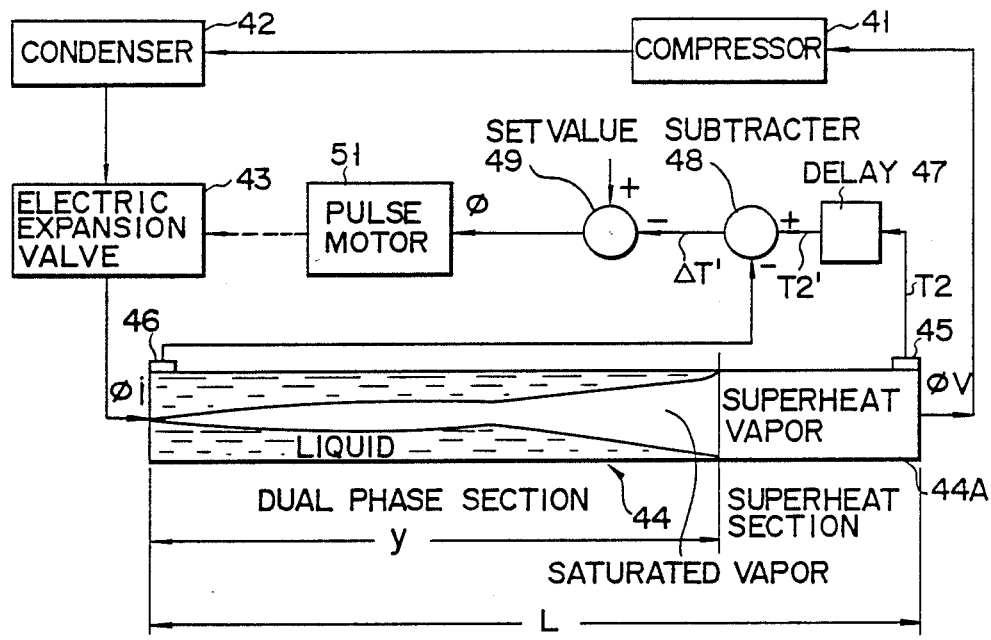
F I G. 10
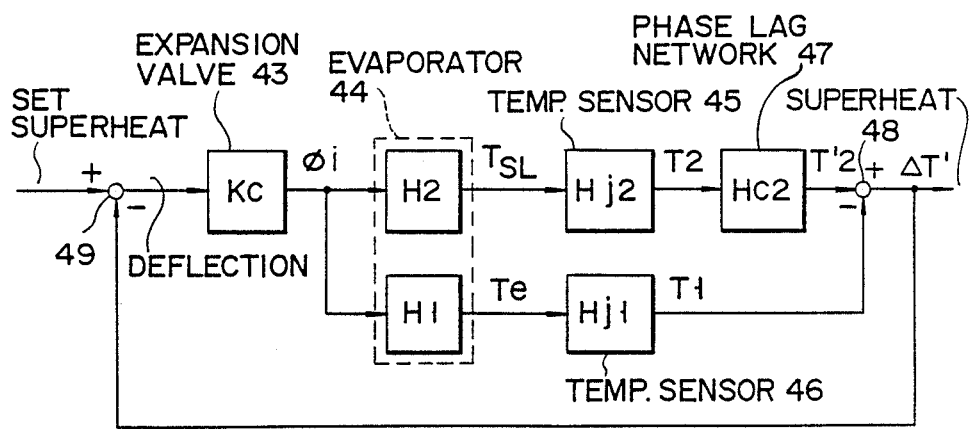
F I G. 11

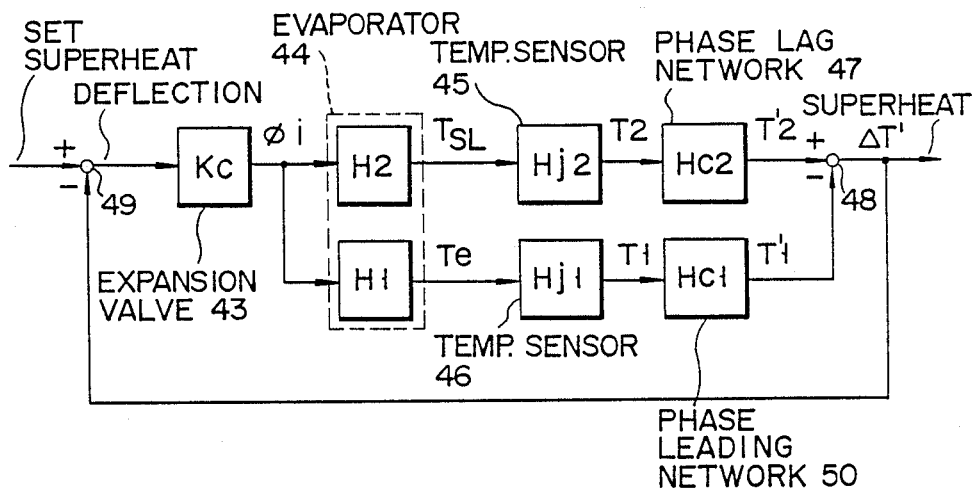
F I G. 13

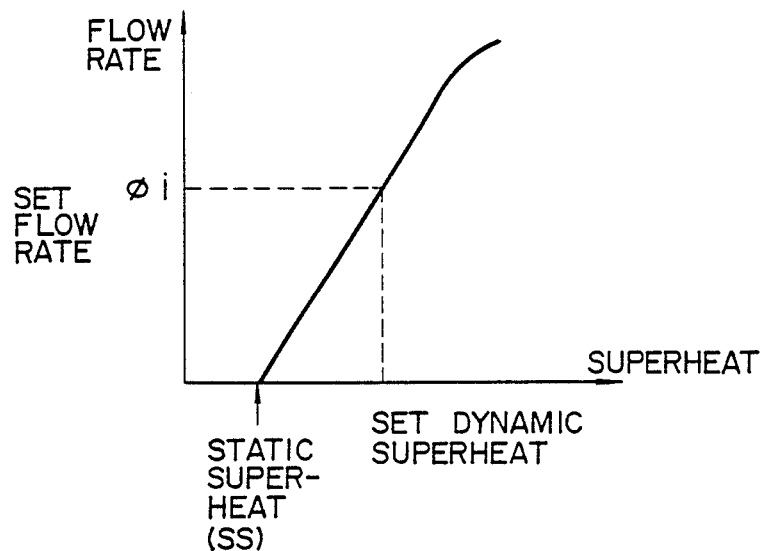
F I G. 14
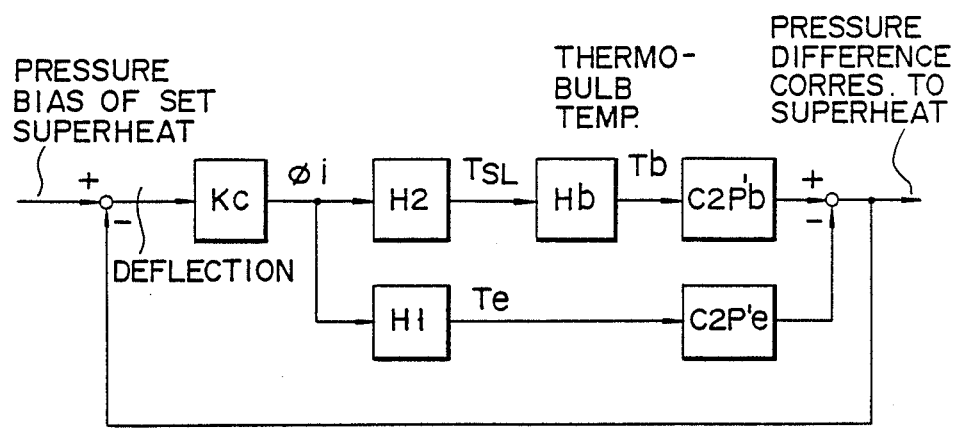
F I G. 15

METHOD FOR CONTROLLING REFRIGERATING SYSTEM

BACKGROUND OF THE INVENTION

1. Field of the Invention

This invention relates to a method for controlling flow rate of refrigerant in the refrigerating cycle, more particularly to a method for controlling refrigerating systems having an expansion valve as an electric refrigerant flow rate controlling means to keep constant the degree of superheat at the outlet of an evaporator.

2. Description of the Related Art

A pressure reducing device called an electric expansion valve or electronic expansion valve is used as an electric refrigerant flow rate controlling means in the refrigerating cycle. FIG. 1 shows the construction of the prior art refrigerant flow rate control apparatus.

The refrigerant flow rate control apparatus of FIG. 1 includes compressor 1, condenser 2, electric expansion valve 3, and evaporator 4. In the case where an electric refrigerant flow rate controlling means is used, compressor 1 may be so designed that the rotation speed thereof can be changed by means of an inverter. The degree of opening of electric expansion valve 3 can be set in response to an electric signal. The apparatus further includes first temperature sensor 5 for sensing the evaporating temperature, second temperature sensor 6 for sensing the superheated vapor temperature at the outlet of evaporator 4 and control circuit 7.

In the refrigerant flow rate controlling method using the apparatus of FIG. 1, the control operation is generally effected to keep constant the temperature difference between the evaporating temperature in the evaporator and the superheated vapor temperature at the evaporator 4 outlet in various cases including the case where a plurality of objects are to be controlled, for example, where the rotation speed of compressor 1 or the loads of evaporator 4 and compressor 2 are controlled. That is, a difference between measurements by first and second temperature sensors 5 and 6 is first detected, then a temperature difference ΔT between the detected temperature difference and a preset superheated refrigerant temperature is detected, and control circuit 7 is operated to supply an output signal corresponding to detected temperature difference ΔT to electric expansion valve 3, thus setting the degree of opening or the valve opening of electric expansion valve 3 to control the flow rate of refrigerant.

The control method has been adopted to make the best use of the function of a thermostatic expansion valve.

The electric expansion valve 3 is utilized since it is considered that the method for controlling the electric expansion valve 3 can be made more advantageous than that for controlling the thermostatic expansion valve which was formerly used.

For example, a control signal for the thermostatic expansion valve is a pressure difference. In contrast, a control signal for driving the electric expansion valve 3 is an electric signal. Therefore, it is possible to generate a first signal (which is hereinafter referred to as a proportional term) obtained by multiplying detected temperature difference ΔT by first proportional constant K1, second signal (which is hereinafter referred to as an integration term) obtained by integrating detected temperature difference ΔT with respect to time and multiplying the integrated value by second proportional constant K2, and third signal (which is hereinafter referred to as differentiation term) obtained by differentiating detected temperature difference ΔT with respect to time and multiplying the differentiated value by third proportional constant K3, thus permitting PID control to be effected. In contrast, the control operation for the thermostatic expansion valve is based on proportional control operation.

PID control operation can be represented by the following equation:

$$E = K_1 \Delta T + K_2 \int (\Delta T) dt + K_3 \frac{d(\Delta T)}{dt} \tag{1}$$

where

E: a valve opening specifying signal supplied to the electric expansion valve,

ΔT: detected temperature difference (T2−T1)−ΔT0,

T1: temperature detected by the first temperature sensor,

T2: temperature detected by the second temperature sensor,

ΔT0: preset temperature of superheated refrigerant,

K1: proportional constant of the proportional term,

K2: proportional constant of the integration term,

K3: proportional constant of the differentiation term.

As described above, in the case where the electric expansion valve 3 is used to control the degree of superheat of refrigerant by the refrigerant flow rate controlling method, the integration term of $K_2 \cdot \int (\Delta T) dt$ and the differentiation term of $$K_3 \cdot \frac{d(\Delta T)}{dt}$$

are used as control factors in addition to the proportional term of $K_1 \cdot \Delta T$. Therefore, it has been considered that more reliable control can be attained in this case in comparison with the case where the thermostatic expansion valve is used.

In the actual control operation, however, it is sometimes impossible to control the degree of super-heat in the refrigerating cycle and the response characteristic with respect to the fluctuation in the load may happen to become extremely deteriorated.

In order to solve the problems, the following proposals have been made in the prior art.

(1) It has been considered that the degree of refrigerant superheat in the evaporator cannot be correctly controlled when the load condition, for example, the temperature in the refrigerating chamber is greatly changed. The reason therefor is as follows:

The rate of refrigerant flowing through the electric expansion valve 3 set at the preset degree of valve opening in the refrigerating cycle is a function of pressure difference ΔP between pressures on the high and low pressure sides in the refrigerating cycle. At the same time, the flow rate of refrigerant is a function of the degree of valve opening. Therefore, a group of curves showing the relation between the refrigerant flow rate and the pressure difference between the high and low pressures can be obtained when the degree of valve opening is changed as a parameter.

Assume that the degree of valve opening increases from Eα to Eβ according to equation (1) due to variation in detected temperature difference ΔT when the refrigerating cycle is effected with pressure difference ΔP1. Assume that, at this time, increase in the refrigerant flow rate is ΔM1. Further, assume that the operation point in the refrigerating cycle is varied to change the pressure difference at the operating point to ΔP2. At this time, the degree of valve opening is changed from Eα to Eβ based on equation (1) due to variation in detected temperature difference ΔT in the same manner as described above. In this case, variation in the flow rate is ΔM2. However, since the curve of relation between ΔP and ΔM is changed with the degree of valve opening as a parameter, refrigerant flow rates ΔM will be changed even if detected temperature differences ΔT are the same.

Thus, it is considered that the undesirable response characteristic is caused by the fact that, since the flow rate characteristic of the flow rate control valve in the operating conditions as described above is not taken into consideration, the amount of variation in the refrigerant flow rate may greatly differs even if the same instructions for controlling the degree of valve opening of the electric expansion valve 3 are given.

According to this consideration, the amount of variation in the refrigerant flow rate may be changed depending on the operating condition if the coefficients in the proportional, integration and differentiation terms of a signal of determining the degree of valve opening are kept constant irrespective of the operating condition in the refrigerating cycle. Therefore, a control method is proposed in which the condenser temperature is detected, and the operating condition in the refrigerating cycle is determined by the detected condenser temperature together with the temperature at the evaporator inlet to correct the coefficients (refer to Japanese Patent Disclosure No. 61-89454).

(2) Further, the following proposal has been made with much attention taken to the similarity of the electric expansion valve to the thermostatic expansion valve 3. For example, in a system of FIG. 2 in which the rotation speed of compressor 11 is fixed, if a rise in the ambient temperature or an increase in the thermal load of evaporator 14 occurs to cause a disturbance to be input into the control system, the vapor temperature slightly rises and the temperature of the refrigerant at the outlet is greatly enhanced. In this case, the heat capacity of the evaporator 14 is large and therefore the response time is delayed. This causes the degree of refrigerant superheat at the outlet to be increased with time delay, and the degree of valve opening of electronic expansion valve 13 is set larger by means of control circuit 16 and pulse motor 17 according to a signal from subtracter circuit 15, increasing the flow rate of refrigerant from condenser 12. However, it takes a long time for the effect of an increase in the flow rate of the refrigerant to be transmitted to the outlet of evaporator 14 because of the transfer lag of the refrigerant in evaporator 14 and the heat capacity. Further, time delay occurs in the operation of temperature sensor 18 for temperature detection of the refrigerant in evaporator 14.

That is, an unstable condition is set up in the feedback control system for controlling the refrigerant flow rate due to the response lag in evaporator 14 and temperature sensor 18.

It is considered that the unstable condition can be eliminated by inserting a time delay compensating element into the valve driving electric circuit in the case where the electronic expansion valve 13 is used.

This consideration derives out an idea of utilizing the technical concept of phase lag-lead in addition to the technical concept of the PID operation used in the consideration (1). The technical consideration has produced the following proposal.

In response to inputs corresponding to variations in the thermal load and the refrigerant flow rate, the refrigerant flow rate is feedback-controlled by a refrigerant superheat signal representing the degree of refrigerant superheat at the evaporator outlet and having a large time delay. Therefore, the superheat response characteristic is deteriorated. This problem may be solved by combining a feedforward control system with the feedback control system for controlling the flow rate in the electronic expansion valve by a superheat signal. The feedforward control system serves to directly control the flow rate in the electronic expansion valve 13 by a temperature signal of air supplied from the exterior into the evaporator 14 for heat exchange. In this case, the temperature signal of air may be generated from a thermistor. With this countermeasure, the response speed can be made high to improve the superheat response characteristic to a great extent.

However, in the two types of technical considerations described above, the superheat signal of the electric flow rate controlling and pressure reducing means is dealt with in the same manner as the superheat signal in the thermostatic expansion valve. That is, the substantial nature of the superheat signal is not taken into consideration and the superheat signal is used as it is and combined with other additional signals to improve the control characteristics. This makes the control system rather complicated and cannot attain the desired purpose.

In practice, even with the complicated control system, the control system having the electric expansion valve 3 has not been realized which is far superior to that having the thermostatic expansion valve from the view point of superheat control.

It has been also proposed to replace the classical PID system by an excellent control system including a sample-hold type optimal regulator using a computer. However, in this case, it is not considered to improve the nature of the superheat signal.

SUMMARY OF THE INVENTION

An object of this invention is to provide a control method for a refrigerating system which can attain a stable operation at a high response speed.

According to this invention, in a system utilizing electric refrigerant flow rate controlling and pressure reducing means as means for reducing the pressure of refrigerant liquid in a refrigerating system to permit easy evaporation of the refrigerant in an evaporator and controlling the flow rate of refrigerant into the evaporator, a control method is achieved in which an electric signal corresponding to the evaporating temperature of the refrigerant and an electric signal corresponding to the temperature of superheated refrigerant gas at the outlet of the evaporator are obtained to control the control means in response to a signal which varies depending on the degree of refrigerant superheat at the outlet of the evaporator, the electric signal corresponding to the temperature of superheated refrigerant gas at the outlet of the evaporator is processed by a means for subjecting an input signal to a phase lag element, the opening degree of an electric expansion valve is controlled by a signal of difference between the processed signal and the electric signal corresponding to the evaporating temperature.

In this invention, the prior art technical idea is not used in which a difference signal ΔT (which should be essentially represented in the form of multiplication by the proportional constant but is used for brief representation. This is also applied to the representations of T1 and T2) between electric signal T1 representing the evaporating temperature and electric signal T2 representing the superheat temperature at the outlet of the evaporator is directly used as a basic control signal. In order to attain the stable control, T2′ (an output signal of a first-order delay circuit) is derived by supplying electric signal T2 to the first-order delay circuit, and T1′ (an output signal from a phase advancing circuit) is derived by supplying electric signal T1 representing the evaporating temperature to the phase advancing circuit which reduces the delay time corresponding to the time constant of the temperature sensor for electric signal T1 by a preset delay amount. Then, ΔT′ is derived from (T2′−T1′) and ΔT′ is used as a basic control signal instead of ΔT. In this case, it is possible to attain the relatively stable control operation without passing T1 through the phase advancing circuit by, for example, using a thermocouple as the temperature sensor which has a high response speed. This will be explained in more detail later. It should be understood that this technical concept is also included in this invention.

BRIEF DESCRIPTION OF THE DRAWINGS

FIGS. 3 to 7 are vector locus diagrams showing characteristics of the prior art refrigerating systems and refrigerating systems according to this invention;

FIG. 10 is a model diagram of an evaporator used in one embodiment of this invention;

FIG. 11 is a block diagram of an embodiment of this invention;

FIG. 13 is a block diagram of another embodiment;

FIG. 14 is a characteristic diagram of an electric expansion valve; and

FIG. 15 is a block diagram of a thermostatic expansion valve.

DETAILED DESCRIPTION OF THE PREFERRED EMBODIMENTS

There will now be described embodiments of this invention with reference to the drawings. First, the criterion for stability of the operation of this invention is explained.

(The stability of refrigerating system)

In general, the simplified Nyquist stability criterion is used for establishing the criterion for stability of a refrigerating system which is controlled by means of a feedback control method. This is the method used in the case of this embodiment. That is, the operation of the control circuit in which is a loop transfer function H(s) having been subjected to Laplace transformation is stable if the loop transfer function H(s) has no pole on the right hand side of S-plane and when a point $(-1+j\cdot 0)$ is observed on the left hand side from the vector locus obtained by changing ω from 0 to ∞. In this case, s in H(s) is replaced by jω. This is disclosed in "An Introduction to Automatic Control" (from OHM Co.) by KEISUKE IZAWA, at page 135.

In order to apply the stability criterion to the refrigerating system, it is necessary to clearly understand the dynamic characteristic of the evaporator in the refrigerating system. The dynamic characteristic will be described in detail later.

Now, the superiority of the stability attained by the method according to this invention is explained with reference to the dynamic characteristic by comparing the control method using a thermostatic expansion valve, the prior art controlling method in which an electric expansion valve is controlled in the same manner as the thermostatic expansion valve and an electric flow rate controlling and pressure reducing means according to one embodiment of this invention. In this explanation, an expansion valve of pulse motor driving type is used as a typical example of the electric flow rate controlling and pressure reducing means and is represented by the electric expansion value 3.

Figure 1:
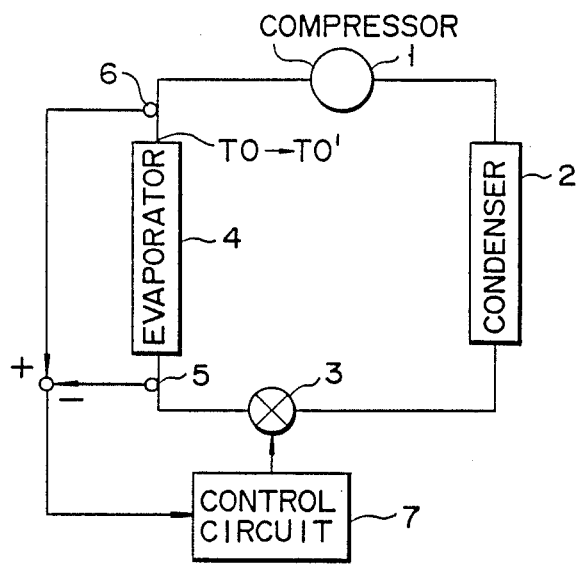
FIGS. 1 and 2 are block diagrams each showing the construction of the prior art refrigerating system.
Figure 2:
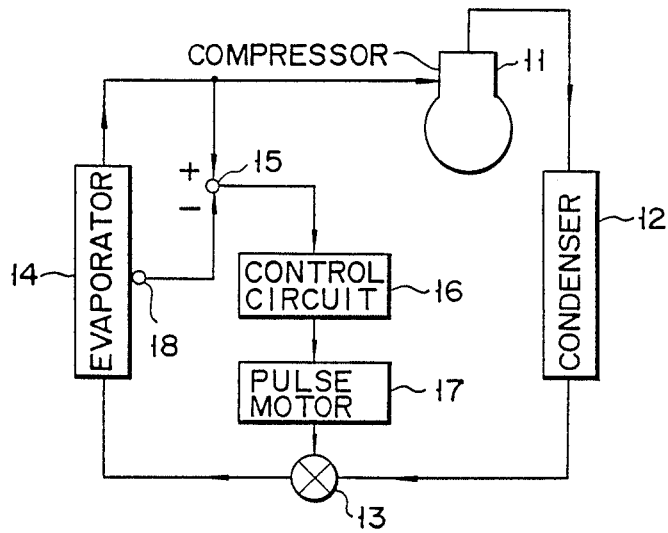

It is considered that the low stability of the electric expansion valve 3 operated by the prior art controlling method in FIG. 1 is caused by the fact that the electric expansion valve 3 is used simply instead of the thermostatic expansion valve. Therefore, the control operation of the thermostatic expansion valve is first examined. As a result of this examination, the following fact is found. In the case where the thermostatic expansion valve is used, since a 3-stage heat transmission path is provided from the time when the temperature of superheated vapor is transmitted to a thermo-bulb for sensing the temperature of superheated vapor at the outlet of the evaporator 4 until the heat transmission to the thermo-bulb causes variation in pressure of gas filled in the thermo-bulb, the transfer function can be regarded as being substantially equivalent to that of three phase lag elements with single time constants, respectively, which are serially connected. In contrast, since the dynamic characteristic of the refrigerating system is complicated in comparison with other systems, the system can be regarded as having a large time constant. That is, when the thermostatic expansion valve is used in the system, the characteristic of the thermo-bulb can be in fact regarded as corresponding to a large time constant which the refrigerating system originally has, and causes the stability to be enhanced.

In the thermostatic expansion valve, since the evaporating temperature is directly applied as the evaporating pressure to a diaphragm when it is detected, the time constant can be regarded as being markedly small in comparison with that of the thermo-bulb.

Figure 3:
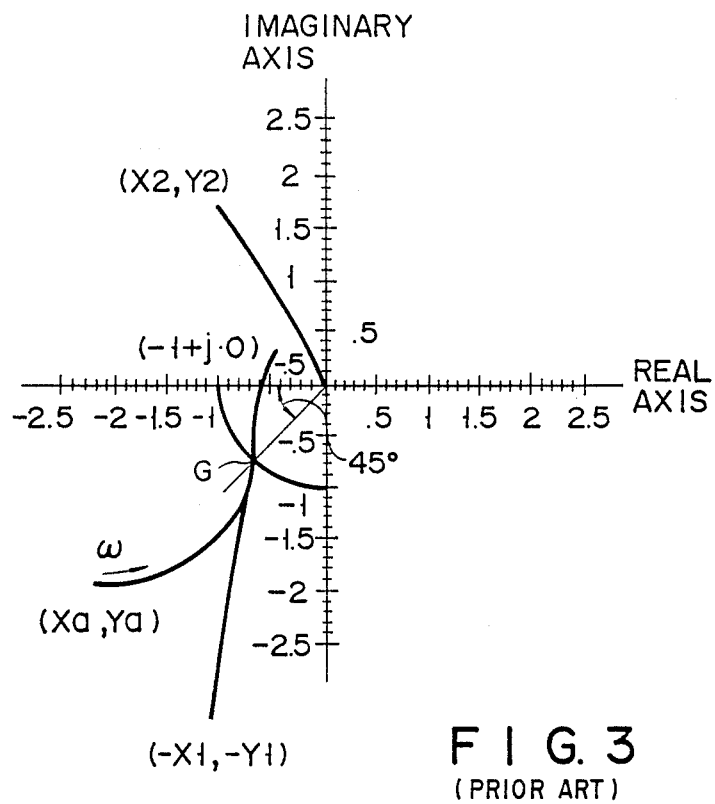

FIG. 3 is a vector locus-Nyquist diagram of the ordinary thermostatic expansion valve. In this case, a phase margin of 45° is obtained and the stability is sufficiently high. The phase margin is an angle made by a line connecting the origin with a point $(-1+j.0)$ and a line connecting the origin with a point at which the vector locus intersects a circle with the origin as a center and passing the point $(-1+j.0)$. As the vector locus approaches the point $(-1+j.0)$, the phase margin decreases.

FIG. 4 shows an example of vector locus-Nyquist diagram obtained when the phase lag function of the thermo-bulb in the thermostatic expansion valve is omitted. In this case, the phase margin is reduced to 18°. In the above cases, a time constant of the transfer function relating to the evaporation temperature is regarded as being approximately 0.

Figure 5:
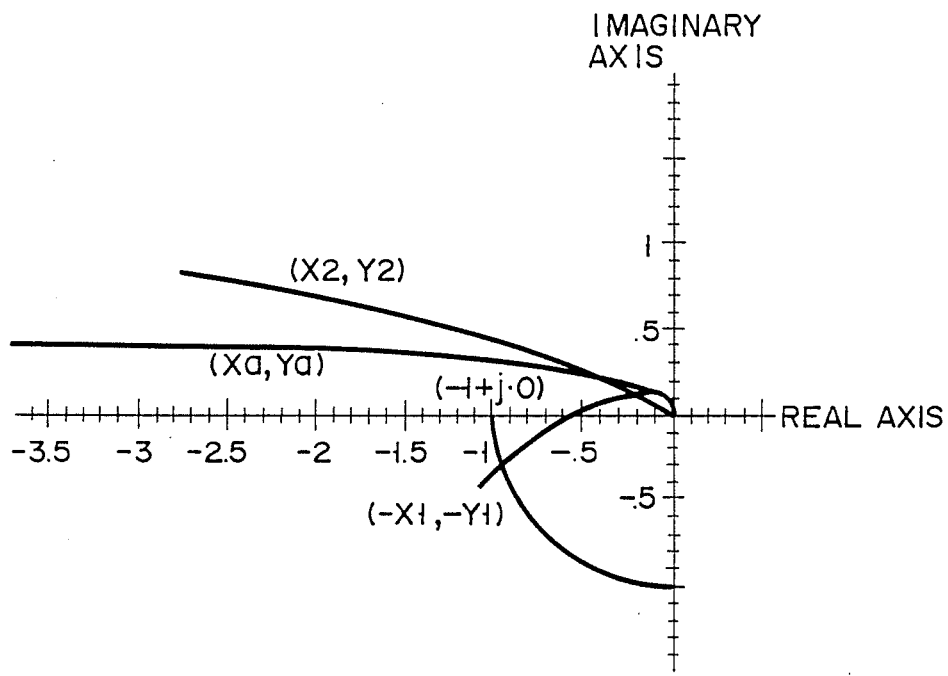

FIG. 5 is a vector locus-Nyquist diagram obtained when the electric expansion valve 3 is directly controlled by an electric signal corresponding to temperature difference ΔT or (T2−T1) according to the prior art control method. In FIG. 5, a locus denoted by (−X1, −Y1) corresponds to the evaporating temperature of the refrigerant at the inlet of the evaporator 4 and a locus denoted by (X2, Y2) corresponds to the superheated vapor temperature at the outlet of the evaporator 4. Since the sum thereof is (Xa, Ya), point (−1+j∞0) is located to the right of the vector locus when ω increases. The operation of the electric expansion valve 3 is inevitably unstable since the valve 3 is directly controlled by the electric signal corresponding to temperature difference ΔT.

Thus, it is understood that the control operation according to the prior art control method is unstable. FIG. 6 is a vector locus-Nyquist diagram of one embodiment of this invention in which a phase lag element with a time constant of 20 seconds is introduced into a control path relating to the transfer function of a superheated vapor temperature signal of the electric expansion valve 3. Other conditions are the same as those in FIG. 5. In FIG. 6, vector locus (X2, Y2) obtained by the superheated vapor temperature signal is located near the origin, and therefore it is not shown. Thus, in FIG. 6, vector locus (−X1, −Y1) is substantially overlapped with the sum vector locus (Xa, Ya). As is clearly seen, the stability higher than that in FIG. 5 is attained and a phase margin of 17° can be obtained.

The stability shown in FIG. 6 is almost equal to that shown in FIG. 4.

Figure 7:
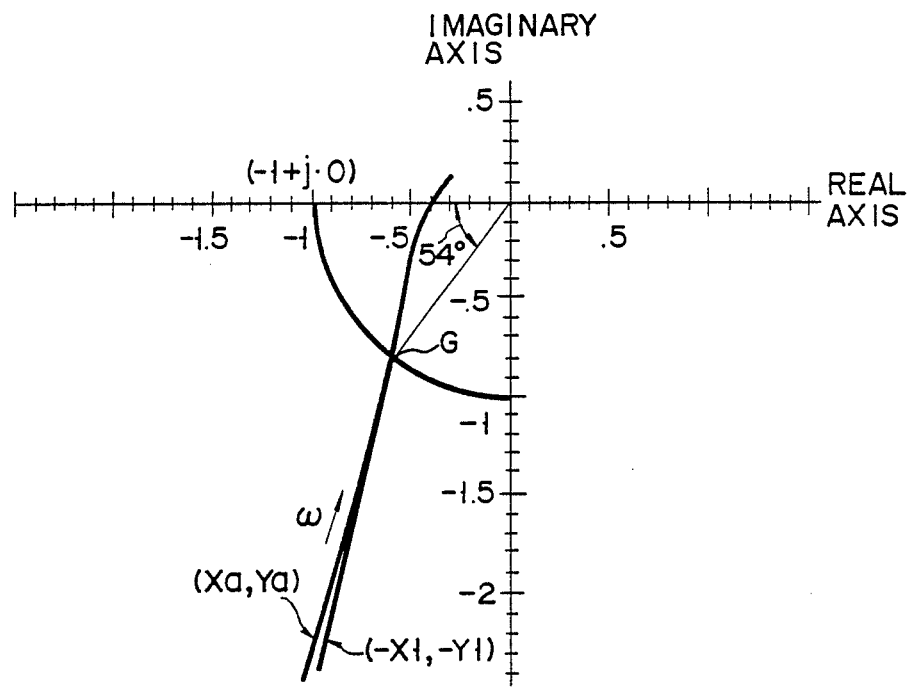

FIG. 7 is another vector locus-Nyquist diagram representing the characteristic of an embodiment designed to operate more stably. In order to operate stably regardless of changes in the evaporating temperature, this embodiment has a phase lead network for processing an electric signal corresponding to the temperature T1, thereby reducing the time constant of the temperature sensor 5 for detecting temperature T1. In this case, a phase margin of 54° is obtained, remarkably increasing the stability. Also in this case, vector locus (X2, Y2) is small and is not shown in FIG. 7.

Next, there is explained means for realizing a phase lag network and a phase lead network for processing an electric signal generated from the temperature sensor based on the above analysis.

(Example of an electrical circuit for a phase lag element)

Figure 8:
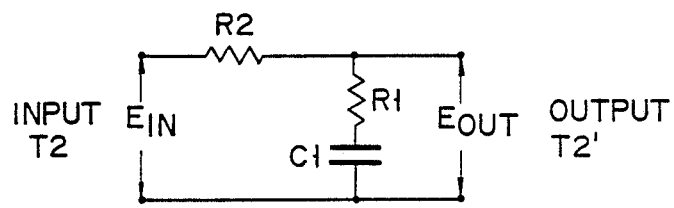
FIG. 8 is a connection diagram of an electrical network for a phase lag element.

A phase lag network is explained with reference to FIG. 8. In FIG. 8, electric signal T2 output from the temperature sensor 6 for sensing the temperature at the evaporator outlet is supplied to Ein, and electric signal T' is derived from Eout. Thus, signal T' processed in the phase lag network can be obtained. Assuming that R1 and R2 are resistors and C1 is a capacitor, then the transfer function $G_I(s)$ of the circuit can be expressed as follows:

$$G_I(s) = \frac{E_{out}}{E_{in}} = \frac{R_1 + \frac{1}{SC_1}}{R_1 + R_2 + \frac{1}{SC_1}} = \frac{1 + SC_1R_1}{1 + SC_1(R_1 + R_2)}$$

Assuming that $C_1R_1 \equiv T_I$, and $\beta \equiv (R1+R2)/R1 > 1$, then $G_I(s)$ can be rewritten as follows:

$$G_I(s) = \frac{1 + ST_I}{1 + S\beta T_I}$$

When, for example, C1∼2μfd, R1∼0.5 MΩ, and R2∼9.5 MΩ, then $T_I=1$ and $\beta=20$.

Therefore, $$G_I(j\omega) = \frac{1 + j\omega}{1 + j20\omega},$$

and a phase lag element with a time constant of 20 seconds is obtained.

(Phase lead network)

Figure 9:
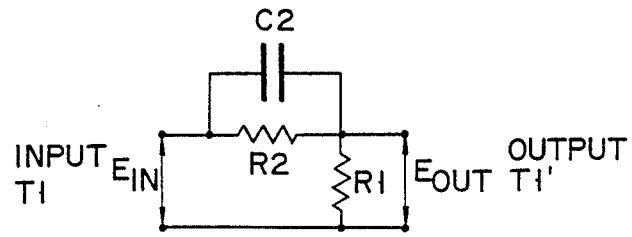
FIG. 9 is a connection diagram of an electrical network for a phase lead element.

A phase lead network is explained with reference to FIG. 9. In FIG. 9, an electric signal corresponding to T1 and generated from the temperature sensor 5 for sensing the evaporating temperature at the inlet of the evaporator 4 is supplied to Ein, and an electric signal corresponding to T1' is derived from Eout. Thus, the electric signal corresponding to the evaporating temperature is subjected to the phase lead process.

Assuming that R1 and R2 are resistors and C1 is a capacitor, then the transfer function GD(s) of the circuit can be expressed as follows:

Assuming that $$G_D(s) = \frac{E_{out}}{E_{in}} = \frac{R_1}{R_1 + \frac{1}{\frac{1}{R_2} + SC_2}} = \frac{R_1}{R_1 + \frac{R_2}{1 + SC_2R_2}}$$

and $$T_D \equiv C_2R_2 \frac{R_1}{R_1 + R_2} \equiv \alpha < 1$$

$G_D(s)$ can be rewritten as follows:

$$G_D(s) = \frac{R_1 \cdot (1 + ST_D)}{R_1 + R_2 + ST_DR_1} = \frac{\alpha(1 + ST_D)}{1 + \alpha T_DS}$$

When, for example, C2=1μfd, R2=1 MΩ, and R1=10 KΩ, then α≈0.01.

In this case, the time constant of the temperature sensor can be compensated for by $(1+ST_D)$ and the time constant of $\alpha T_D \sim 0.01$ sec. can be obtained. It is necessary to previously amplify the signal by 1/α by an amplifier.

Before explaining the operation and effect of this invention, basic equations are derived which are used to represent the operations of the evaporator 4 (or heat exchanger for absorbing heat from the exterior) of the refrigerating system and the subsystem including a control system for controlling the amount of refrigerant supplied into the evaporator 4. The following symbols are used for easy understanding of calculations. If there is no special note for units, the following units indicated in brackets are used.

| SYMBOL | | [UNIT] |
|---|---|---|
| A: | cross-sectional area of evaporator | [m$^2$] |
| C: | specific heat | [Jkg$^{-1}$K$^{-1}$] |
| C$_1$: | characteristic value of compressor | |
| C$_2$: | characteristic value of expansion | |

-continued

| SYMBOL | | [UNIT] |
|---|---|---|
| | valve | |
| $d_i$: | inner diameter of evaporator | [m] |
| $d_0$: | outer diameter of evaporator | [m] |
| h: | specific enthalpy | [Jkg$^{-1}$] |
| $h_i$: | specific enthalpy of refrigerant supplied to evaporator | [Jkg$^{-1}$] |
| L: | length of evaporator | [m] |
| m: | mass of refrigerant in two-phase state or in liquid-phase and gas-phase at the inlet of evaporator | [kg] |
| P: | pressure | [Pa] |
| t: | time | [s] |
| T: | temperature | [K] |
| $T_0$: | temperature of external air supplied for heat exchange in evaporator | [K] |
| $T_{SL}$: | temperature of heating gas at the end of evaporator | [K] |
| x: | coordinates along evaporator from the inlet of evaporator | [m] |
| y: | length of portion in two-phase state (coordinates of transition point) | [m] |
| v: | specific volume of refrigerant | [m$^3$kg$^{-1}$] |
| α: | average void factor when portion in two-phase state is regarded as being one system | |
| $α_0$: | heat-transfer coefficient for external surface of evaporator and air | [W m$^{-2}$K$^{-1}$] |
| $α_i$: | heat-transfer coefficient for refrigerant and internal surface of evaporator in two-phase state | [W m$^{-2}$K$^{-1}$] |
| $α_{is}$: | heat-transfer coefficient for refrigerant and internal surface of evaporator in two-phase state in superheated portion | [W m$^{-2}$K$^{-1}$] |
| φ: | flow rate | [kgs$^{-1}$] |
| $φ_i$: | flow rate of mass supplied to expansion valve | [kgs$^{-1}$] |
| ρ: | density | [kgm$^{-3}$] |

The subscripts indicate the followings:
b: thermal-bulb
e: evaporator (Te: evaporating temperature)
l: liquid
s: superheated vapor (Ts: temperature of superheated vapor)
v: vapor
w: wall of evaporator.

A subscript of o is used to indicate the ordinary state.

A character H is used to indicate the transfer function. The transfer function has been subjected to Laplace transformation.

$$H_1(s) = T_e(s)/φ_i(s)$$

$$H_2(s) = T_{SL}(s)/φ_i(s)$$

($T_{SL}$ is a temperature of refrigerant in the end of the evaporator)

$$H_{j1}(s) = 1/(1+τ_1 S)$$

transfer function of the temperature sensor for evaporating temperature $$H_{j2}(s) = 1/(1+τ_2 S)(1+τ_3 S)$$

transfer function of heat to be transmitted through the temperature sensor for superheated vapor temperature and the wall surface of a suction pipe extending from the evaporator to the compressor $$H_{c2}(s) = 1/(1+τ_4 S)$$

control transfer function
Differential symbols are as follows:

$$ρ_l' ≡ dρ_l(s)/dT_e(s)$$

$$ρ_v' ≡ dρ_v(s)/dT_e(s)$$

$$h_l' ≡ dh_l(s)/dT_e(s)$$

$$h_v' ≡ dh_v(s)/dT_e(s)$$

$$α_i' ≡ dα_i(s)/di(s)$$

$$α_{is}' ≡ dα_i(s)/dv(s)$$

where
$τ_1$: time constant of the temperature sensor (sec),
$τ_2$: time constant of the superheated vapor temperature sensor (sec),
$τ_3$: time constant of the wall surface of the suction pipe (sec),
$τ_4$: time constant for control (sec).

Evaporator 44 used in this explanation is modified into a model evaporator according to FIG. 10 as follows. The refrigerant is supplied from compressor 41 to evaporator 44 via condenser 42 and electric expansion valve 43 and then fed back to compressor 41.

A long pipe 44A with an inner diameter di is provided in evaporator 44. The effective length of pipe 44A is L. Cooling fins (not shown) are attached to the outer surface of pipe 44A. The external area is R times large as that of the internal area. Therefore, the external area for unit length is expressed as follows:

$$πd_o = R·πd_i$$

Evaporator 44 is divided into two portions, i.e. a two-phase state portion and a superheating portion. The length y of the two-phase state portion is subject to vibration inherent to two-phase flow and a time-averaged length is set to y in this model. Sensor 46 for sensing the evaporating temperature of the refrigerant is mounted on the inlet of evaporator 44 and sensor 45 for sensing the superheated vapor temperature is attached to the outlet of evaporator 44. An output of sensor 45 is supplied via first-order delay circuit 47 to subtractor 48 which in turn produces an output corresponding to the difference between outputs of sensors 45 and 46. Subtractor 49 supplies an output corresponding to the difference between the output of subtractor 48 and a preset superheat valve to drive pulse motor 51 which in turn controls the degree of opening of valve 43.

(Basic equations)

(a) Two-phase state portion
Mass equilibrium equation:

$$φ_i - φ_v = \frac{d}{dt}(m_l + m_v) \quad (1)$$

$$m_l = (1-α)Aρ_l · y \quad (2)$$

$$m_v = αAρ_v y \quad (3)$$

Energy equilibrium equation for refrigerant:

$$φ_i h_i - φ_v h_v + α_i πd_i y(T_w - T_e) = \frac{d}{dt}(m_l h_l + m_v h_v) \quad (4)$$

Thermal equilibrium equation for the wall of two-phase state portion:

$$\rho_w C_w A_w \frac{dT_w}{dt} = \alpha_0 \pi d_0 (T_0 - T_w) - \alpha_i \pi d_i (T_w - T_e) \quad (5)$$

$\phi_v$ denotes compressor flow rate of refrigerant which is supplied from evaporator 44 to compressor 41 and the flow rate changes according to the compressor characteristic depending on the evaporating temperature Te. Therefore, the following equation can be obtained:

$$\phi_v(s) = C_1 T_e(s) \quad (6)$$

(b) Superheating portion

Temperature Ts of superheated vapor is a function of time and position. Therefore, the following equation is obtained:

$$\frac{dT_s}{dt} = \frac{\partial T_s}{\partial t} + \frac{\partial T_s}{\partial x} \cdot \frac{dx}{dt}$$

where traveling speed $dx/dt$ can be expressed by $\phi_v/\rho_v A$. Thus, the following equation is obtained:

$$\rho_v C_v A \frac{\partial T_s}{\partial t} + C_v \phi_v \frac{\partial T_s}{\partial x} = \alpha_{is} \pi d_i (T_{ws} - T_s) \quad (7)$$

When heat-transfer in an axial direction is omitted, the energy equilibrium equation for the wall of evaporator 44 is expressed as follows:

$$\rho_w C_w A_w \frac{\partial T_w}{\partial t} = \alpha_0 \pi d_0 (T_0 - T_{ws}) - \alpha_{is} \pi d_i (T_{ws} - T_s) \quad (8)$$

The above equations (1) to (8) are the basic equations.

(Calculation for the two-phase state portion)

Only variation amounts are indicated in the following:

From equation (2), the following equation is obtained.

$$m_l(s) = (1 - \alpha) A [\rho_{l\alpha} y(s) + y_0 \rho_l' T_e(s)] \quad (L2)$$

The following equation can be derived from equation (3):

$$m_v(s) = \alpha A [\rho_{v\alpha} y(s) + y_0 \rho_v' T_e(s)] \quad (L3)$$

With the above equations and the following symbols, the variation amount in equation (1) can be expressed as follows:

$$\phi_i(s) - \phi_v(s) = (My(s) + M'y_0 T_e(s)) S \quad (L1)$$

where $$M = (1 - \alpha) A \rho_{lo} + \alpha A \rho_{vo} \quad (D1)$$

$$M' = (1 - \alpha) A \rho_l' + \alpha A \rho_v' \quad (D2)$$

$$E = (1 - \alpha) A \rho_{lo} h_{lo} + \alpha A \rho_{vo} h_{vo} \quad (D3)$$

$$E' = (1 - \alpha) A \rho_{lo} h_l' + \alpha A \rho_{vo} h_v' \quad (D4)$$

$$E'' = (1 - \alpha) A \rho_l' h_{lo} + \alpha A \rho_v' h_{vo} \quad (D5)$$

The following equation can be obtained from equation (4):

$$h_i \phi_i(s) - \quad (L4)$$

$$h_{vo} \phi_v(s) - \phi_{vo} h'_v T_e(s) + \alpha_{io} \pi d_i y_0 (T_w(s) - T_e(s)) +$$

$$d_{io} \pi d_i y(s) (T_{wo} - T_{eo}) + \alpha_1' \pi d_{y_0} (T_{wo} - T_{eo}) \phi_i(s) =$$

$$ESY(s) + (E' + E'') y_0 S T_e(s)$$

The following equation can be derived from equation (5):

$$T_w(s) - T_e(s) = \quad (L5)$$

$$\frac{-(\rho_w C_w A_w S + \alpha_0 \pi d_0) T_e(s) - \alpha_i' \pi d_i (T_{wo} - T_{eo}) \phi_1(s)}{\rho_w \cdot C_w \cdot A_w \cdot S + \alpha_0 \pi d_0 + \alpha_{io} \pi d_i}$$

Equation (L5) is substituted into equation (L4), and symbols are defined as follows using equation (6).

$$\lambda_1(s) \equiv \quad (D6)$$

$$h_i + \alpha_i' \pi d_{y_0} (T_{wo} - T_{eo}) - \frac{\alpha_{io} \pi d_{y_0} \alpha_i' \pi d_i (T_{wo} - T_{eo})}{\rho_w C_w A_w S + \alpha_0 \pi d_0 + \alpha_{io} \pi d_i}$$

$$\lambda_2(s) \equiv \alpha_{io} \pi d_i (T_{wo} - T_{eo}) - E_s \quad (D7)$$

$$\lambda_3(s) \equiv (E' + E'') y_0 s = \frac{\alpha_{io} \pi d_{y_0} (\rho_w C_w A_w S + \alpha_0 \pi d_0)}{\rho_w C_w A_w S + \alpha_0 \pi d_0 + \alpha_{io} \pi d_i} + \quad (D8)$$

$$\phi_{vo} h_v' + C_1 h_{vo}$$

Equation (L5) is rewritten as follows using the above symbols:

$$\lambda_1(s) \phi_i(s) + \lambda_2(s) y(s) = \lambda_3(s) T_e(s) \quad (A)$$

The following equation is derived from equations (6) and (L1):

$$\phi_i(s) - MSY(s) = (C_1 + M'y_0 S) T_e(s) \quad (B)$$

The following transfer function H1(s) is obtained by cancelling y(s) from equations (A) and (B):

$$H_1(s) \equiv \frac{T_e(s)}{\phi_i(s)} = \frac{\lambda_1(s) Ms + \lambda_2(s)}{Ms \lambda_3(s) + (C_1 + M'y_0 S) \lambda_2(s)} \quad (C)$$

Since it is easy to derive the relation in the steady state portion from the above basic equations, the explanation therefor is omitted.

(Calculation for superheating portion)

First, H2(s) is derived using the following representations which are used to simplify the form of the basic equations and the other equations.

$$C_v \phi_{vo} \equiv \gamma_1 \quad (D9)$$

$$\frac{\alpha_0 \pi d_0 \cdot \alpha_{iso} \pi d_i}{\alpha_0 \pi d_0 + \alpha_{iso} \pi d_i} \equiv \gamma_3 \quad (D10)$$

$$\beta_6 \equiv (T_o - T_{eo}) \frac{\gamma_3}{\gamma_1} \exp\left\{ -\frac{\gamma_3}{\gamma_1} (L - y_o) \right\} \quad (D11)$$

-continued $$\gamma_2 \equiv \rho_v C_v As + \frac{\alpha_{iso}\pi d_i(\rho_w C_w A_w S + \alpha_0 \pi d_0)}{\rho_w C_w A_{ws} + \alpha_0 \pi d_0 + \alpha_{iso}\pi d_i} \quad (D12)$$

$$\gamma_4 = \gamma_3(T_o - T_{eo}) \frac{\alpha_{is}'}{\alpha_{iso}} \cdot \frac{\rho_w C_w A_w S + \alpha_0 \pi d_0}{\rho_w C_w A_{ws} + \alpha_0 \pi d_0 + \alpha_{iso}\pi d_i} \quad (D13)$$

In the above equations, since yo is the boundary of variation, $\Delta T_{so}$ for variation of $\Delta y_o$ is taken into consideration. Further, the following representations are used.

$$\beta_5 \equiv \exp\left\{\frac{\gamma_2}{\gamma_1}(L - y_o)\right\} \quad (D14)$$

$$\beta_7 \equiv \frac{\gamma_4}{\gamma_2 - \gamma_3}\left\{e^{-\frac{\gamma_3}{\gamma_1}(L-y_0)} - e^{-\frac{\gamma_2}{\gamma_1}(L-y_0)}\right\} \quad (D15)$$

From the above equations, the following equation can be attained:

$$T_{SL}(s) = \beta_5 T_e(s) + \beta_7 \phi_v(s) = (\beta_5 + C_1\beta_7)T_e(s)$$

Further, the following equation is derived by correcting the above equation with respect to the traveling boundary:

$$T_{SL}(s) = (\beta_5 + C_1\beta_7)T_e(s) = \beta_6 y(s) \quad (E)$$

By using equation (B) for the two-phase state portion to omit y(s) from the above equation, the following equation can be obtained:

$$H_2(s) = \quad (F)$$

$$\frac{T_{SL}(s)}{\phi_i(s)} = \left\{(\beta_5 + C_1\beta_7) + \beta_6\frac{C_1 + y_0M's}{Ms}\right\}H_1(s) - \frac{\beta_6}{Ms}$$

(Derivation of H1(s) and H2(s) convenient for calculations)

First, H1(s) and H2(s) are arranged to have numerators and denominators in a polynomial expression having a variable of s.

The relations of coefficients can be expressed as follows:

$\mu_1 \equiv \alpha_{io}\pi d_i y_0$ $\mu_2 \equiv \alpha_0 \pi d_0/\rho_w C_w A_w$ $\mu_3 \equiv (\alpha_0 \pi d_0 + \alpha_{io}\pi d_i)/\pi_w C_w A_w$ $\mu_4 \equiv (E' + E'')y_0$ $\mu_5 \equiv \phi_{v0}h_v' + C_1 h_{v0}$ $\mu_6 \equiv \alpha_{io}\pi d_i(T_{wo} - T_{eo})$ $\mu_7 \equiv h_i + \alpha_i'\pi d_i y_0(T_{wo} - T_{eo})$ $\mu_8 \equiv \mu_6 y_0 \alpha_i' \pi d_i/\rho_w C_w A_w$ $$H_1(s) = \frac{C(1)S^2 + C(2)S + C(3)}{C(4)S^3 + C(5)S^2 + C(6)S + C(7)}$$

where $C(1) \equiv M\mu_7 - E$ $C(2) \equiv M(\mu_3\mu_7 - \mu_8) + \mu_6 - E\mu_3$ $C(3) \equiv \mu_3\mu_6$ $C(4) \equiv M\mu_4 - Ey_0M'$ $C(5) \equiv M(\mu_1 + \mu_5 + \mu_3\mu_4) + \mu_6 y_0 M' - C_1 E - \mu_3 E y_0 M'$ $C(6) \equiv M(\mu_1\mu_2 + \mu_3\mu_5) + C_1\mu_6 + (\mu_6 y_0 M' - C_1 E)\mu_3$ $C(7) \equiv C_1\mu_3\mu_6$ Further, the other relations can be expressed as follows:

$\mu_9 \equiv \rho_v C_v A$ $\mu_{10} \equiv (\alpha_0 \pi d_0 + \alpha_{iso}\pi d_i)/\rho_w C_w A_w$ $\mu_{11} \equiv \alpha_{iso}\pi d_i$ $\mu_{12} \equiv \alpha_0 \pi d_0/\rho_w C_w A_w$ $$\beta_5 = \exp\left[\frac{-C(9)S^2 - C(10)S - C(11)}{S + C(8)}\right]$$

where $C(8) \equiv \mu_{10}$ $C(9) \equiv (L - y_0)\mu_9/Y_1$ $C(10) \equiv (L - y_0)(\mu_9\mu_{10} + \mu_{11})/Y_1$ $C(11) \equiv (L - y_0)\mu_{11}\mu_{12}/Y_1$ Transfer function H2(s) can be expressed as follows by using $\beta_5$ and H1(s) in the above equations:

$$H_2(s) =$$

$$\left[\frac{C(14)S + C(15)}{C(12)S^2 + C(13)S} + \frac{C(16)S^2 + C(17)S + C(18)}{C(12)S^2 + C(13)S}\beta_5 + \right.$$

$$\left. C(19) + \frac{C(20)}{S}\right]H_1(s) - \frac{C(21)}{S}$$

where $C(12) = \mu_9$ $C(13) = \mu_9\mu_{10} + \mu_{11} - Y_3$ $C(14) = C_1\mu_{14}\mu_{13}$ $C(15) = C_1\mu_{12}\mu_{13}\mu_{14}$ $C(16) = \mu_9$ $$C(17) \equiv C(13) - C_1\mu_{13}$$

$$C(18) \equiv -C_1\mu_{12}\mu_{13}$$

$$C(19) \equiv \beta_6 y_0 M'/M$$

$$C(20) \equiv C_1\beta_6/M$$

$$C(21) \equiv \beta_6/M$$

It will now be explained that the control method of this invention works effectively by using the transfer function of the control system and the vector locus-Nyquist diagram.

FIG. 11 is a block diagram according to one embodiment of this invention and corresponding to the system shown in FIG. 10. The transfer functions can be expressed in the same manner as before.

$$H_1(s) = \frac{C(1)S^2 + C(2)S + C(3)}{C(4)S^3 + C(5)S^2 + C(6)S + C(7)}$$

$$H_2(s) = \left[ \frac{C(14)S + C(15)}{C(12)S^2 + C(13)S} + C(19) + \frac{C(20)}{S} + \frac{C(16)S^2 + C(17)S + C(18)}{C(12)S^2 + C(13)S} \beta_5 \right] H_1(s) - \frac{C(21)}{S}$$

where $$\beta_5 = \exp\left[ \frac{-C(9)S^2 - C(10)S - C(11)}{S + C(8)} \right]$$

For brevity, only a proportional control section is shown to be provided in a flow rate control section of the electric expansion valve 43 in the control system.

The block diagram in FIG. 11 shows a control system which is provided with first-order delay factor Hc2 by delay circuit 47 in addition to the prior art control system.

Figure 12:
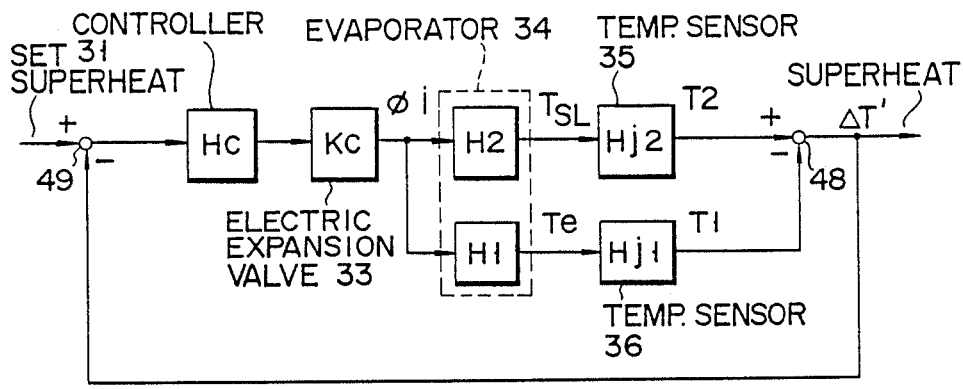
FIG. 12 is a block diagram of the prior art system.

For reference, the block diagram of the prior art control system is shown in FIG. 12. In FIG. 12, the preset superheat signal is compared with an actual superheat signal, and the resultant signal is supplied to controller (transfer function Hc) 31 which in turn produces an output signal for specifying the degree of valve opening of electric expansion valve 33. In response to an output signal from controller 31, electric expansion valve 33 sets flow rate $\phi i$. Then, flow rate $\phi i$ is processed by transfer function H1 relating to the evaporating temperature and transfer function H2 relating to superheated vapor temperature in evaporator 34 which produces evaporating temperature signal Te and superheat temperature signal $T_{SL}$. Te is converted to electric signal T1 by transfer function (Hj1) of the measuring section including temperature sensor 36, and $T_{SL}$ is converted to electric signal T2 by transfer function (Hj2) of the measuring section including temperature sensor 35. Immediately after this, a difference (T2−T1) (=$\Delta T$) is obtained and $\Delta T$ is fed back.

In contrast, in FIG. 11, (T2−T1) is not directly used as a feedback control signal. That is, in FIG. 11, a signal fed back for comparison with the preset superheat signal is attained by supplying signal T2 derived by transfer function Hj2 to first-order delay circuit 47 (transfer function Hc2) to derive T2' and causing subtracter circuit 48 to supply the difference signal (T2'−T1) between T2' and T1.

In the same manner as described before, assume that the time constants of temperature sensors 46 and 45 on the evaporating temperature side and superheat temperature side are respectively set to $\tau 1$ and $\tau 2$. Then, transfer function Hj1(s) of temperature sensor 46 for evaporating temperature and transfer function Hj2(s) of temperature sensor 45 for superheat temperature can be expressed as follows:

$$H_{j1}(s) = \frac{1}{1 + \tau_1 S}$$

$$H_{j2}(s) = \frac{1}{(1 + \tau_2 S)(1 + \tau_3 S)}$$

where $\tau 3$ is a time constant relating to the heat-transfer of the suction pipe from evaporator 44 to compressor 41. The transfer function of first-order delay control section 47 is expressed as follows as described before:

$$H_{c2}(s) = \frac{1}{1 + \tau_4 S}$$

Since the transfer function of electric expansion valve 43 is Kc, the loop transfer function of the loop in the block diagram of FIG. 11 can be expressed as follows:

$$K_c[H_2 \cdot H_{j2} H_{c2} - H_1 \cdot H_{j1}]$$

The vector locus can be obtained by using $S = j\omega$ and changing $\omega$ from 0 to $\infty$.

FIG. 6 shows the result of a calculation effected according to the loop transfer function attained as described above and using the constants of $\phi i = 0.0117$, $\tau_1 = 1$, $\tau_2 = 2$, $\tau_3 = 8.12$, $\tau_4 = 20$ and $Kc = -0.0039$. That is, FIG. 6 shows the case where first-order delay section 47 is provided on the $T_{SL}$ side in FIG. 11 and FIG. 5 shows the prior art case where Hc2 is not provided and constants other than $\tau_4$ are set to the same values as before. As is clearly understood, the stability in the case of FIG. 6 is higher than that in FIG. 5.

Now, another embodiment of this invention including first-order delay circuit 47 (transfer function Hc2) and phase advancing circuit 50 (transfer function Hc1) is explained with reference to FIG. 13.

In the block diagram of FIG. 13, portions other than Hc1 and Hc2 are shown in the same manner as in the block diagram of FIG. 11 in order to emphasize the effect of Hc1 and Hc2.

In FIG. 13, output signal T1 of sensor 46 derived by Hj1 in FIG. 11 is further processed in phase advancing circuit 50 and is converted to T1'. Signal T1' is supplied to subtracter circuit 48 which in turn produces feedback signal $\Delta T'$ (=T2'−T1') corresponding to a difference between two input signals T1' and T2'. Then, a deviation or difference between actual superheat $\Delta T'$ and the preset superheat is generated from subtracter circuit 49, and multiplied by Kc to produce corrected flow rate $\phi i$ which is supplied to evaporator 44. In the same manner as described before, an output of evaporator 44 is divided into two control paths. The output supplied to a first control path is converted to superheated vapor temperature signal $T_{SL}$ by H2(c), fed through the suction pipe and temperature sensor 45 (transfer function Hj2) and subjected to first-order delay control Hc2(s) according to this invention. Thus, electric signal T2' representing the superheated vapor temperature can be derived.

On the other hand, the output of evaporator 44 supplied to a second control path is converted to evaporating temperature Te by H1(s), fed through temperature sensor 46 (transfer function Hj1) to be converted to an electric signal, and subjected to phase advancing control Hc1(s) by phase advancing circuit 50 according to this invention. Thus, electric signal T1' representing the evaporating temperature can be derived.

Then, a difference or deviation between an electric signal corresponding to the preset superheat and difference ΔT' between electric signals T1' and is generated from subtracter circuit 49.

Since the preset superheat is expressed in terms of temperature unit, the deviation is expressed in terms of temperature unit. Only the proportional portion is used for Kc. When superheat ΔT' is higher than the preset temperature, the deviation becomes negative and in this case it is required to enlarge the area of the opening of valve 43. Therefore, Kc comes to have a negative sign. An example of the property of Kc is shown in FIG. 14.

The absolute value |Kc| of Kc represents variation in the flow rate (the flow rate is proportional to the area of the opening) for deviation of 1 K. In FIG. 14, if the static superheat (denoted by SS) is set at 3 K., for example, and the preset superheat is set at 5 K., a predetermined flow rate $\phi i$ is attained when $5-3=2$ K. is set. That is, $$Kc = -\phi i/2$$

When $\phi i = 0.015$ kgs$^{-1}$, $Kc = -0.0075$.

Further, Hc1(s) and Hc2(s) are set as follows:

$$H_{c1}(s) = \frac{1 + ST_D}{1 + \alpha T_D S} \quad (\alpha < 1)$$

$$H_{c2}(s) = \frac{1 + ST_I}{1 + \beta T_I S} \quad (\beta > 1)$$

In order to correspond the conditions to those in the former embodiment, the constants are set as follows: $\phi i = 0.0117$, $\tau_1 = 0.01$, $\tau_2 = 2$, $\tau_3 = 8.12$, $\tau_4 = 20$ and $Kc = -0.0039$.

In this case, a vector locus shown in FIG. 7 is obtained. A phase margin of 54° is attained to provide a high stability.

This is superior to the prior art case explained with reference to FIG. 3 in which a thermostatic expansion valve is used.

For reference, the diagram of the prior art thermostatic expansion valve for calculating the vector locus-Nyquist diagram of FIG. 3 is shown in FIG. 15.

In the diagram of FIG. 15, the degree of valve opening of the expansion valve is determined by a deviation between the preset superheat signal and a superheat signal in the case of the thermostatic expansion valve, thus determining flow rate $\phi i$. Then, in the same manner as described before, evaporating temperature Te processed by transfer function H1 relating to the evaporating temperature is derived from the evaporator. In this case, an actual signal applied to the diaphragm of the thermostatic expansion valve takes the form of "evaporating pressure". Further, the superheated vapor temperature at the evaporator outlet is transmitted to the thermo-bulb via the suction pipe and is converted to a corresponding pressure signal of gas in the thermo-bulb. The pressure signal is supplied together with the "evaporating pressure" signal to the subtracter which in turn supplies as a feedback signal a pressure signal representing a difference between the two input pressure signals.

Loop transfer function in the block diagram of FIG. 15 is expressed in the following form:

$$K_c[H_2 \cdot H_b \cdot C_2 P_b' - H_1 C_2 P_e']$$

H1 and H2 take the same form as before, C2 indicates the characteristic value of the thermostatic expansion valve, Pe' is a temperature differentiation of the evaporating pressure and Pb' is a temperature differentiation of the pressure in the thermo-bulb. Hb(s) is not expressed in the form of a parameter but is represented as follows for brevity:

$$H_b(s) = \frac{1}{33.05S^3 + 103.8S^2 + 20.4S + 1}$$

The calculation is carried out using actual numeral values on the assumption that R22 is used as the refrigerant in the refrigerating system. In this case, a signal on the evaporating temperature side corresponds to the evaporating temperature, and is different from "temperature signal", and therefore $\tau_1$ is set to 0.

In the above embodiments, in the case where numeral values are used, the values are determined on the assumption that R22 is used as the refrigerant if there is no specific explanation. However, the refrigerant used in this invention is not limited to R22.

As described above, according to this invention, the stability of the control operation by the electric flow rate controlling and pressure reducing means including an electric expansion valve 3 as a typical example can be remarkably improved.

This invention effectively eliminates the weakest of the electric flow rate controlling and pressure reducing means that the stability is low in comparison with the thermostatic expansion valve in the case of superheat control. Further, it is possible to make the best use of various functions which the thermostatic expansion valve does not have, thus enhancing the controllability in the whole system.

The explanation thus far made does not refer to the interaction between the control system according to this invention and the control system of another refrigerating system. However, this invention is made to attain the effective heat exchange in the evaporator 4, and therefore it will not affect the operation of other control systems and can be used in combination with other control system utilizing various control logic. Therefore, the method according to this invention can be applied to air conditioning systems, can coolers, and ordinary cooling systems for showcases and the like.

What is claimed is:

1. A method for controlling a refrigerating system which includes an evaporator for evaporating refrigerant by reducing pressure of the refrigerant supplied into the evaporator and electric-driven means for controlling a flow rate of the refrigerant supplied into the evaporator, comprising the steps of:
    obtaining a first signal representing an evaporating temperature of the refrigerant;
    obtaining a second signal representing a superheated temperature of the refrigerant at an outlet of the evaporator;

processing the second signal by a phase lag element to obtain a processed signal;

obtaining a difference signal representing a difference between the processed signal and the first signal; and controlling a flow rate of the refrigerant in accordance with the difference signal.

2. A method for controlling a refrigerating system which includes an evaporator for evaporating refrigerant by reducing pressure of the refrigerant supplied into the evaporator and electric-driven means for controlling a flow rate of the refrigerant supplied into the evaporator, comprising the steps of:

obtaining a control signal which varies depending on the degree of refrigerant superheated at an outlet of the evaporator, said control signal being represented by a difference between a processed electrical signal corresponding to a temperature of the superheated refrigerant at the outlet of the evaporator and subjected to a phase lag element and an electrical signal corresponding to an evaporating temperature of the refrigerant; and controlling the flow rate of the refrigerant at the evaporator by said control signal.

3. A method for controlling a refrigerating system which includes an evaporator for evaporating refrigerant by reducing pressure of the refrigerant supplied into the evaporator and electric-driven means for controlling a flow rate of the refrigerant supplied into the evaporator, comprising the steps of:

obtaining a control signal which varies depending on the degree of refrigerant superheated at an outlet of the evaporator, said control signal being represented by a first processed electric signal which is subjected to a phase lag element for giving phase lag of an electric signal corresponding to a temperature of superheated refrigerant gas at the outlet of the evaporator and a second processed electric signal which is subjected to a phase leading element for leading a phase of an electric signal corresponding to an evaporating temperature of the refrigerant; and controlling the flow rate of the refrigerant by a processed signal representing a difference between the first processed electric signal and the second processed electric signal.

4. A method for controlling the refrigerating system according to claim 2, wherein the processed electric signal corresponding to the temperature of the superheated refrigerant is subjected to the phase lag element of which a transfer function is described as $Hc2(s) = 1/(1+\tau S)$, where $\tau$ is a time constant.

5. A method for controlling the refrigerating system according to claim 3, wherein the processed electric signal corresponding to the temperature of the superheated refrigerant is subjected to the phase lag element of which a transfer function is described as $Hc2(s) = 1/(1+\tau S)$, where $\tau$ is a time constant.

6. A method for controlling a refrigerating system utilizing electric refrigerant flow rate controlling and pressure reducing means as means for reducing the pressure of refrigerant liquid in the refrigerating system and controlling the flow rate of refrigerant supplied into an evaporator to evaporate the refrigerant in the evaporator, comprising the steps of:

controlling said flow rate controlling and pressure reducing means in accordance with a control signal in response to refrigerant superheated at an outlet of the evaporator, said control signal being constituted by a first electric signal corresponding to the temperature of a superheated refrigerant gas at the outlet of the evaporator and a second electric signal corresponding to an evaporating temperature of the refrigerant;

wherein said flow rate controlling pressure reducing means is controlled by a difference between a first processed signal obtained through a first electric network for giving a phase lag of a signal with a time constant larger than that of the first electric signal, and a second processed signal obtained through a second electric network for leading a phase of the second electric signal.

7. A method for controlling a refrigerating system utilizing electric refrigerant flow rate controlling and pressure reducing means as means for reducing the pressure of refrigerant liquid in the refrigerating system and controlling the flow rate of refrigerant supplied into an evaporator to evaporate the refrigerant in the evaporator, comprising the steps of:

controlling the flow rate controlling and pressure reducing means in accordance with a control signal in response to refrigerant superheated at an outlet of the evaporator, said control signal being constituted by a first electric signal corresponding to the temperature of a superheated refrigerant gas at the outlet of the evaporator and a second electric signal corresponding to an evaporating temperature of the refrigerant;

wherein said flow rate controlling and pressure reducing means is controlled by a difference between a first processed signal obtained through a first electric network for cancelling a time constant of the phase lag of said first electric signal and giving the phase lag of a signal with a time constant larger than that of the first electric signal, and a second processed signal obtained through a second electric network for cancelling a time constant of the phase lag of the second electric signal and leading a phase of the second electric signal.

* * * * *

UNITED STATES PATENT AND TRADEMARK OFFICE
CERTIFICATE OF CORRECTION

PATENT NO. : 4,835,980

DATED : June 6, 1989

INVENTOR(S) : Reinosuke Oyanagi et al.

It is certified that error appears in the above-identified patent and that said Letters Patent is hereby corrected as shown below:

Col. 1, line 35, after "orator" insert --4-- line 36, delete "4"

Col. 2, line 43, change "super-heat" to --superheat--

Col. 3, line 19, change "differs" to --differ-- line 26, change "of" (second occurrence) to --for-- line 37, change "taken" to --given-- line 43, change "input" to --inputted--

Col. 4, line 1, after "out" insert --of-- line 3, delete "the" (second occurrence)

line 37, after "which" insert --system-- line 63, change ", the" to --. The-- line 66, change ", the" to --. The--

Col. 5, line 7, change ". This" to --and-- line 64, after "which" insert --there-- line 67, after "of" insert --an--

UNITED STATES PATENT AND TRADEMARK OFFICE
CERTIFICATE OF CORRECTION

PATENT NO. : 4,835,980

DATED : June 6, 1989

INVENTOR(S) : Reinosuke Oyanagi et al.

It is certified that error appears in the above-identified patent and that said Letters Patent is hereby corrected as shown below:

Col. 6, line 16, after "valve" insert --,-- line 19, after "of" insert --a-- line 22, change "value" to --valve-- line 36, after "causes" insert --a--; and after "in" (first occurrence), insert --the-- line 64, after "of" insert --a--

Col. 7, line 13, change "$\infty$" to --.--

Col. 8, line 27, change "GD(s)" to --$G_D(s)$-- lines 37 and 38, between "$C_2R_2$" and "$\frac{R1}{R1 + R2,}$" insert --wherein--

Col. 9, line 38, change "followings" to --following-- line 54, between "evaporator" and ")", insert --.-- line 57, before "transfer" insert --is the-- line 58, after "temperature" insert --.-- line 62, before "transfer" insert --is the-- line 65, after "compressor" insert --.--

UNITED STATES PATENT AND TRADEMARK OFFICE
CERTIFICATE OF CORRECTION

PATENT NO. : 4,835,980
DATED : June 6, 1989
INVENTOR(S) : Reinosuke Oyanagi et al.

It is certified that error appears in the above-identified patent and that said Letters Patent is hereby corrected as shown below:

Col. 10, line 1, before "control" insert --is the--; and after "function" insert --.-- line 20, after "(sec)," insert --and-- line 30, after "times" insert --as-- line 45, correct the spelling of "subtracter"

line 48, change "tractor" to --tracter-- line 49, correct the spelling of "subtracter"

Col. 11, line 30, change "heat-transfer" to --heat transfer--

Col. 12, line 16, change "$\phi_1(s)$" to --$\phi_i(s)$--

Col. 13, line 3, change "$\rho\ _vC_vAs$" to --$\rho\ _vC_vAS$-- line 15, before "$\frac{\gamma\ 2}{\gamma\ 1}$" insert -- - -- line 19, after "yo" (second occurrence), insert --)-- line 58, change "$\mu_2 = (\alpha_0\pi d_0 + \alpha_{io}\pi d_i)/\pi_w C_w A_w$" to --$\mu_3 \equiv (\alpha_0\pi d_0 + \alpha_{io}\pi d_i)/\rho_w C_w A_w$--

UNITED STATES PATENT AND TRADEMARK OFFICE
CERTIFICATE OF CORRECTION

PATENT NO. : 4,835,980

DATED : June 6, 1989

INVENTOR(S) : Reinosuke Oyanagi et al.

It is certified that error appears in the above-identified patent and that said Letters Patent is hereby corrected as shown below:

Col. 14, line 39, change "$Y_1$" to --$\gamma_1$-- line 41, change "$Y_1$" to --$\gamma_1$-- line 43, change "$Y_1$" to --$\gamma_1$-- line 61, change "$Y_3$" to --$\gamma_3$--

Col. 16, line 67, after "Hj2)" insert --,--

Col. 17, line 12, after "and" insert --a-- line 13, change "is" to --T2' are-- line 16, change "unit" to --units--; and after "is" insert --also-- line 17, change "unit." to --units.-- line 23, after "represents" insert --a-- line 24, after "(" but before "the" (second occurrence), insert --where-- line 25, after "for" insert --the--

UNITED STATES PATENT AND TRADEMARK OFFICE
CERTIFICATE OF CORRECTION

PATENT NO. : 4,835,980

DATED : June 6, 1989

INVENTOR(S) : Reinosuke Oyanagi et al.

It is certified that error appears in the above-identified patent and that said Letters Patent is hereby corrected as shown below:

Col. 18, line 24, delete "," and after "from" insert --the-- line 39, after "that" insert --renders-- and delete "is"

line 49, delete "the" (first occurrence)

line 52, change "system" to --systems--

Signed and Sealed this

Twenty-ninth Day of May, 1990

Attest:

HARRY F. MANBECK, JR.

*Attesting Officer*   *Commissioner of Patents and Trademarks*